United States Patent
Voigtlaender et al.

(10) Patent No.: US 8,079,603 B2
(45) Date of Patent: Dec. 20, 2011

(54) SYSTEM FOR REGULATING THE POSITION OF THE CHASSIS OF A MOTOR VEHICLE

(75) Inventors: Klaus Voigtlaender, Wangen (DE); Lars von Jakubowski, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 12/224,266

(22) PCT Filed: Feb. 26, 2007

(86) PCT No.: PCT/EP2007/051786
§ 371 (c)(1),
(2), (4) Date: Dec. 12, 2008

(87) PCT Pub. No.: WO2007/101796
PCT Pub. Date: Sep. 13, 2007

(65) Prior Publication Data
US 2009/0157257 A1    Jun. 18, 2009

(30) Foreign Application Priority Data
Mar. 6, 2006  (DE) .......................... 10 2006 010 101

(51) Int. Cl.
*B60G 17/019*   (2006.01)
*B60G 17/0165*  (2006.01)
(52) U.S. Cl. .................... 280/5.514; 280/6.157; 701/37
(58) Field of Classification Search ................. 280/5.5, 280/5.507, 5.513, 5.514, 5.518, 6.157, 6.159, 280/6.15, 6.151, 6.152, 6.154, 6.155, 6.16; 342/70; 701/37, 38; 340/443; 180/167, 180/169
See application file for complete search history.

(56) References Cited

U.S. PATENT DOCUMENTS

| | | | |
|---|---|---|---|
| 3,859,660 A | 1/1975 | Augustine et al. | |
| 5,892,357 A * | 4/1999 | Woods et al. | 324/96 |
| RE37,725 E | 6/2002 | Yamada | |
| 7,151,479 B2 * | 12/2006 | Beez et al. | 342/70 |
| 2008/0238644 A1* | 10/2008 | Voigtlaender et al. | 340/443 |

FOREIGN PATENT DOCUMENTS

| | | | |
|---|---|---|---|
| DE | 40 39 629 | | 6/1992 |
| DE | 199 23 484 | | 11/2000 |
| DE | 101 57 426 | | 6/2003 |
| EP | 0 389 501 | | 4/1994 |
| EP | 1 437 276 | | 7/2004 |
| JP | 60 142208 | | 7/1985 |
| JP | 7-329636 | | 12/1995 |
| JP | 2958456 | | 10/1999 |
| JP | 2004-216954 | | 8/2004 |
| LU | 90903 | | 9/2003 |
| WO | WO 2006/097384 | * | 9/2006 |

* cited by examiner

Primary Examiner — Paul N Dickson
Assistant Examiner — Keith Frisby
(74) Attorney, Agent, or Firm — Kenyon & Kenyon LLP

(57) ABSTRACT

A system for regulating the position of a chassis of a motor vehicle has actuators which are to be set via actuating signals of a regulating and control unit, the position of the chassis or a part of the chassis being recorded via a gap sensor, and an adjustment is carried out via the actuators in case the measured sensor signals of the gap sensor deviate from specified setpoint values. On the vehicle's underside, at least three displacement measuring sensor device are located at positions that are at a distance from one another, each sensor device having a gap sensor that works in a contactless manner, via which at least two displacement measurements are able to be carried out in different directions.

11 Claims, 1 Drawing Sheet

SYSTEM FOR REGULATING THE POSITION OF THE CHASSIS OF A MOTOR VEHICLE

BACKGROUND OF THE INVENTION

1. Field of the Invention

The present invention relates to a system for regulating the position of the chassis of a motor vehicle.

2. Description of Related Art

Published German patent document DE 40 39 629 describes a system for controlling or rather regulating a chassis of a motor vehicle having variably adjustable spring/damping systems between the vehicle's wheels and the vehicle body. The relative motions between the wheels and the vehicle body are recorded by sensors, as well as the longitudinal motions and the lateral motions of the vehicle, the sensor signals ascertained being recalculated to reflect body motions, taking into account the vehicle's characteristics variables and vehicle parameters, which include a stationary and a non-stationary component. The damping characteristic in the spring/damping system is adjusted as a function of the calculated body motion, whereby body motions such as vertical motion, rolling motion or pitching motion may be counteracted.

In order to implement this control or regulating system, several sensors are required at each suspension strut to ascertain the various states of motion of the vehicle body. The use of various sensors which may, if necessary, also differ in the type of sensor, for instance in their application as displacement measuring, angle measuring or power measuring sensors, represents a comparatively complex system, which requires a high expenditure for hardware and software.

BRIEF SUMMARY OF THE INVENTION

An object of the present invention is to create a system for regulating the position of the vehicle body of a motor vehicle that is distinguished by reduced complexity without the loss of data.

The system according to the present invention for regulating the position of the chassis of a motor vehicle includes at least three separated sensor arrangements at the under side of the vehicle, having in each case one gap sensor that works contact-free, which is in a position to carry out at least two displacement measurements in different directions. This is preferably achieved with the aid of a send/receive unit assigned to each gap sensor respectively, and a beam splitter for generating at least two scanning beams including an angle with respect to each other. In the send/receive unit, a sensor beam is first generated which splits up in the postconnected beam splitter into at least two scanning beams including an angle with respect to each other. These two scanning beams point in different directions and are thus in a position to measure different distances between the location of the sensor device and a vehicle component or the surroundings on which the respective scanning beam is incident. A phase control member or a lens geometry may be used as beam splitter. The radiation may also be switched to be staggered in time.

The advantage of this embodiment is in the use of a unified sensor system, since the at least three sensor devices, that are at a distance from one another, are constructed in the same manner, whereby, in addition to cost savings based on using the same parts, one may also achieve an improved reliability and a lower measure of complexity, both with regard to the hardware and the software. The possibilities of error influence are reduced, and in addition, weight and electrical energy requirements may be reduced.

The measurement takes place in a contactless manner using in each case only one sensor device, via which at least two different displacement measurements are able to be carried out. Alternatively to the concept mentioned above of beam splitting, it is also possible to utilize the planar or spatial beam region of the send/receive unit for carrying out at least two measurements in different measuring directions, which may be done by selecting certain measuring directions within the beam region that is developed, for instance, as a lobe or a cone. This yields the same advantages, in principle, as when a beam splitter is used.

Per gap sensor, at least two displacement measurements, but particularly three displacement measurements, are able to be carried out advantageously. What is involved in these displacement measurements is, for example, the distance between the chassis and the ground, the distance between the chassis and a wheel rim and/or the distance between the chassis and an obstacle lying in front of the gap sensor, any combination of two or three distance measurements named above, or even all three distance measurements named above being able to be carried out. Position regulation, but possibly also position control are especially taken into consideration, and the actuators for regulating the position of the chassis are activated if there is a difference between one measured value of the sensor signals and a specified setpoint value. Basically, the position regulation may be carried out quasi statically, that is, under given load conditions as a one-time adaptation, or it may take place dynamically, for example, during cornering or during travel over uneven ground, adapted dynamically to the respective travel condition, which may be done particularly by adaptive spring/damper systems, such as sky hook systems. A quasi static position regulation is performed, for example, for setting the illumination range or for the case of a trailer loading or the one-sided loading by raising the chassis to a specified level. In general, rolling, pitching and vertical motions may be compensated both in a quasi-static or a static plane as well as in a dynamic plane. If necessary, a compensation of yawing motions is also possible.

Ultrasound sensors, radar sensors, lidar sensors or video sensors may be used as sensors working in a contactless manner. Because of their insensitivity to soiling and their good measuring accuracy, radar sensors are preferred which, by the way, are also not negatively influenced by environmental influences such as snow, rain, sand or the like. Short-range radars at a frequency range between 77 GHz and 81 GHz are particularly applied. Using a bandwidth of 4 GHz, a resolution of 3.75 cm may be achieved, that is, targets at this distance are able to be distinguished, which makes possible differentiating between a wheel rim and the ground, and a corresponding distance measuring between the location of the sensor device on the chassis floor and the wheel rim or the floor. The measuring accuracy takes place at an accuracy higher by a factor of 100, which leads to an absolute accuracy of about 0.4 mm.

The measuring time amounts to 10 ms, for example, the angular range within which a detection takes place is limited, for instance, to 0.02°.

An angular correction may be carried out by having the sensors detect the height changes of the chassis or the chassis and suspension with respect to the ground level of the vehicle, both on the right side of the vehicle and the left. Undesired rolling motions may be controlled using oppositely directed actuator motions on the left and the right side of the vehicle.

In the case of a pitch angle correction, simultaneous height changes of the chassis with regard to the ground level at the front of the vehicle and the rear of the vehicle are detected via the sensor devices situated at a distance from one another in the longitudinal direction of the vehicle, an adjustment again taking place via oppositely directed actuator motions at the front of the vehicle and the rear of the vehicle.

A level regulation generally takes place when there are loading state changes for the vehicle which result in height changes. In addition, or alternatively to raising to the desired level, a warning may also be given in response to overloading or uneven loading. The same applies to sensed inclinations of the chassis. If necessary, an automatic speed adjustment may also be carried out as a measure, particularly a speed reduction.

A chassis regulation may be carried out in a rapid and very precise manner, since the height measurements ascertained using the sensor device permit one to draw a conclusion on possible unevenness in the roadway, compared to measuring methods from the related art, a higher precision of the measured data, and accordingly a more precise adjustment of the chassis existing, or being possible. In addition, in the case of a forward-looking detection of the ground level lying ahead of the wheels, an obstacle or an unevenness may be detected even before one drives over it, such as stones, holes or curbstones, whereupon avoiding or evasive measures may be taken, or adjustments in the chassis, such as changes in the damping rate of the spring/damping system.

An additional advantage is the possibility of being able to establish effects such as ageing of individual vehicle components, even over longer time periods. For instance, by storing the height data, ageing of the shock absorbers may be detected by analyzing the time response of the measured data. To the extent that ageing or other changes are determined, that take place in a slow or creeping manner in the behavior of vehicle components, corresponding data may be displayed or employed for possible countermeasures in the vehicle. For instance, even a creeping air loss in a vehicle's wheel may be detected, and so may wear in shock absorbers.

DETAILED DESCRIPTION OF THE INVENTION

Figure 1:
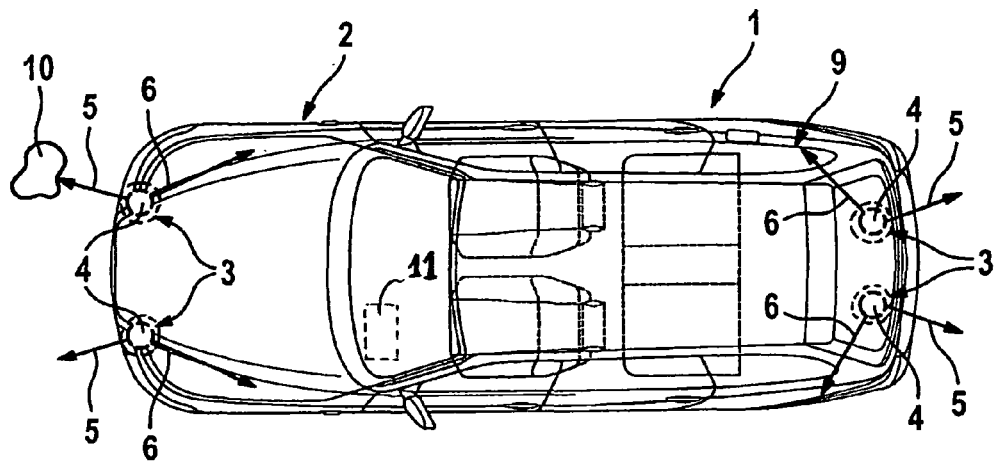
FIG. 1 shows a top view of a vehicle having altogether four similarly constructed sensor devices on the underside of the chassis, which each include a gap sensor working in a contactless manner, which ascertains both the distance between chassis and ground and the distance between the chassis and the closest wheel rim, and also the distance from a possible obstacle lying ahead.

Motor vehicle 1 shown in the figures has altogether four sensor devices 3 arranged in distributed fashion on the underside of chassis 2, and they are placed in the front left, front right, rear left and rear right areas of the vehicle. Sensor devices 3 include exclusively gap sensors 4 that work in contactless fashion, which are developed to carry out displacement measurement. Exactly one gap sensor 4 is expediently assigned to each sensor device 3. The gap sensors measuring in contactless fashion are particularly radar sensors; however, laser sensors, ultrasound sensors, lidar sensors or sensors based on video may also be considered. When it comes to radar-based sensors, close-range radar is particularly used. Sensor devices 3 that are placed in distributed fashion are constructed identically to one another. At least three such sensor devices are expediently provided on the underside of the chassis; however, in addition, more than the four sensor devices shown may be provided, for example, six sensor devices 3 placed in distributed fashion. The position of sensor devices 3 on the underside of the chassis may also be varied, for instance, a sensor device may also be provided in the middle of the vehicle, both as seen in the longitudinal direction and in the transverse direction. For the orderly functioning and the cooperation of the sensor signals supplied by the individual sensor devices, as great as possible a distance is advantageous between the sensor devices, both in the longitudinal direction and in the transverse direction, in order to improve the accuracy of the angle calculation, especially when there is an inclination of the vehicle about the transverse axis and about the longitudinal axis.

The distance between the respective position of the gap sensor and the obstacle lying in the direction of the generated scanning beam is to be ascertained via gap sensors 4 that exclusively measure displacement and that are placed on the underside of the chassis. With the aid of a beam splitter, at least two, but especially three scanning beams 5, 6 and 7 are expediently generated, using in each case only one gap sensor 4, of which scanning beam 5 is directed forwards in the case of front sensor devices 3, and reaches out over the vehicle's front end, as shown in FIG. 1, and, for instance, is able to detect an obstacle 10 lying on the ground, such as a stone or even a curb stone. In the case of sensor devices 3 situated in the rear section of the vehicle, obstacle scanning beam 5 is directed to the rear, and reaches out over the rear edge of the vehicle, in order to be able to scan obstacles lying on the ground, when the vehicle travels to the rear. Obstacle scanning beams 5 run approximately in the longitudinal direction of the vehicle, but may include a small angle of ca. up to 20° with the longitudinal axis of the vehicle, gap sensors 4 being angled in the direction towards the respectively adjacent side of the vehicle in the left and the right vehicle area.

The distance between the chassis and the respectively closest wheel rim 9 may be detected using additional scanning beam 6, which is generated by the beam splitter of gap sensor 4. Consequently, the relative motion between each wheel and chassis 2 may be ascertained via wheel rim scanning beam 6.

The distance between chassis 2 and ground 8 may be ascertained using third scanning beam 7. Ground scanning beam 7 expediently runs vertically downwards, whereas wheel rim scanning beam 6 runs spatially, that is, it has one component in the vehicle's longitudinal direction, one in the transverse direction and one in the vertical direction. Obstacle scanning beam 5 also has one component each in the x, y and z direction in the vehicle's coordinate system.

The measuring signals from each sensor device 3 gathered from scanning beams 5, 6 and 7 are supplied to a regulating unit and control unit situated in the vehicle, in which the values for the dipping motion in the vertical direction, as well as the pitching values and the rolling angle values, as well as, perhaps, even the yaw angle are calculated from the displacement signals gathered, while taking into account the vehicle geometry. While taking into consideration the time curve, corresponding values in the speed plane and acceleration plane may also be ascertained, using known computational methods. In addition, ageing processes may be detected, for instance, in the spring/damping systems, via a long-term observation of the measuring series.

Figures 2, 3:
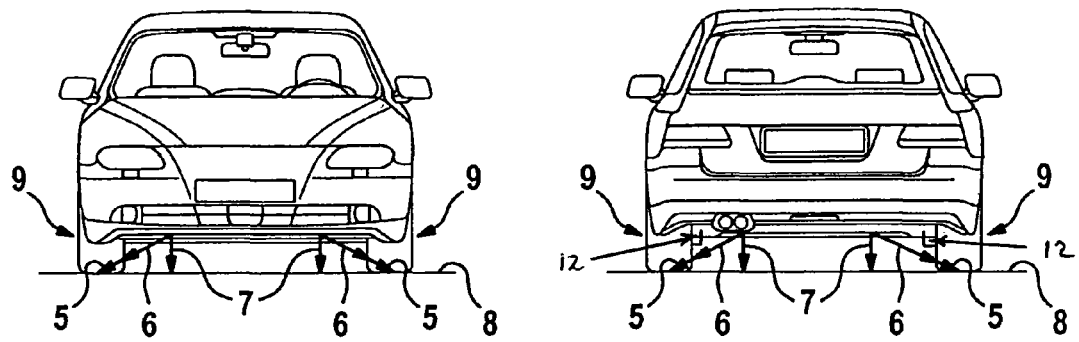
FIG. 2 shows the vehicle in a view from the front.
FIG. 3 shows the vehicle in a view from the rear.
Figure 4:
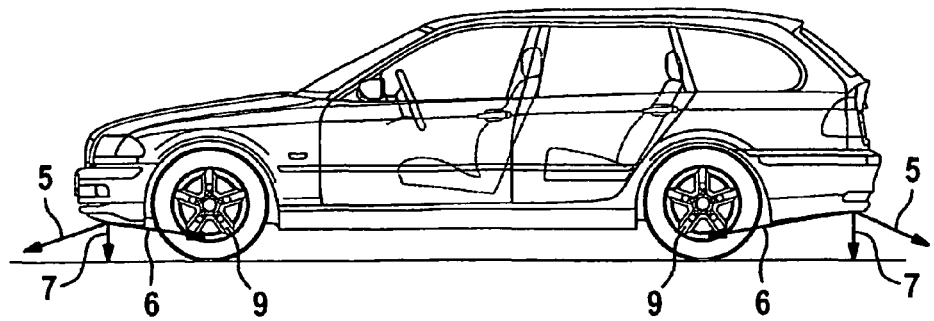
FIG. 4 shows the vehicle in a side view.

Both interventions in engine management and the actuation of actuators 12 (shown in FIG. 3) in the vehicle, especially in the chassis, as well as interventions in brake regulating systems, come into consideration as measures to be taken, and also the influencing of other, safety-relevant functions such as, for instance, headlight regulation, tire pressure regulation or even convenience functions such as resetting the mirror or the seat position.

Moreover, the present invention includes a method for the position regulation of the chassis of a motor vehicle. In this method, the chassis is set via command signals of a regulating and control unit 11 (shown in FIG. 1) as a function of sensor signals from gap sensors, via which the position of the chassis or a component connected to the chassis is recorded. For this, at at least three positions on the underside of the vehicle, distanced from one another, displacement measures are executed in a contactless manner, at each of these positions at least two displacement measurements are performed in various directions. A chassis adjustment is carried out in the case where the measured sensor signals deviate from specified setpoint values. Furthermore, a control unit is provided for carrying out the method.

What is claimed is:

1. A control system for regulating a position of a chassis of a motor vehicle, the chassis having associated actuators for adjusting the chassis, comprising:
    at least three displacement measuring sensor devices located at three separate positions on the underside of the vehicle, wherein each displacement measuring sensor device includes one gap sensor configured to operate in a contactless manner, wherein each gap sensor is configured to record the position of at least the chassis, and wherein each gap sensor is configured to perform at least two displacement measurements in different directions; and
    a control unit configured to perform an adjustment of at least one of the actuators if a measured sensor signal of one of the gap sensors deviates from a specified setpoint value.

2. The system as recited in claim 1, wherein each gap sensor is configured to ascertain the distance between the chassis and the ground.

3. The system as recited in claim 2, wherein each gap sensor is configured to ascertain the distance between the chassis and a wheel rim.

4. The system as recited in claim 2, wherein each gap sensor is configured to ascertain the distance from the gap sensor to an obstacle lying forward of the gap sensor.

5. The system as recited in claim 2, wherein the at least three displacement measuring sensor devices are situated adjacent to wheels of the motor vehicle.

6. The system as recited in claim 5, wherein one displacement measuring sensor device is assigned to each vehicle wheel.

7. The system as recited in claim 2, wherein each gap sensor is configured to generate at least two scanning beams separated by an angle with respect to each other.

8. The system as recited in claim 2, wherein if the measured sensor signal of one of the gap sensors deviates from the specified setpoint value, a quasi-static position regulation of a vehicle component is carried out.

9. The system as recited in claim 2, wherein if the measured sensor signal of one of the gap sensors deviates from the specified setpoint value, a dynamic position regulation of a vehicle component is carried out.

10. The system as recited in claim 2, wherein the gap sensors are configured as short-range radars.

11. A method for regulating a position of a chassis of a motor vehicle, the chassis having associated actuators for adjusting the chassis, comprising:
    providing at least three displacement measuring sensor devices located at three separate positions on the underside of the vehicle, wherein each displacement measuring sensor device includes one gap sensor configured to operate in a contactless manner, wherein each gap sensor is configured to record the position of at least the chassis, and wherein each gap sensor performs at least two displacement measurements in different directions; and
    performing an adjustment of at least one of the actuators if a measured sensor signal of one of the gap sensors deviates from a specified setpoint value.

* * * * *